United States Patent [19]

Bills et al.

[11] Patent Number: 4,701,098
[45] Date of Patent: Oct. 20, 1987

[54] CABLE WHEEL HANDLING AND TRANSPORTING TRAILER

[75] Inventors: Joseph W. Bills; William D. Moller, both of Mitchell, S. Dak.

[73] Assignee: Dakota Mfg. Co., Inc., Mitchell, S. Dak.

[21] Appl. No.: 911,920

[22] Filed: Sep. 26, 1986

[51] Int. Cl.$^4$ ................................................ B60P 1/48
[52] U.S. Cl. .................................. 414/502; 180/19.2; 242/86.5 R; 414/546; 414/684; 414/908; 414/911
[58] Field of Search .............. 414/501, 502, 537, 684, 414/908, 910, 911, 507, 539, 546; 242/86.5 R; 180/19.2

[56] References Cited

U.S. PATENT DOCUMENTS

| | | | |
|---|---|---|---|
| 3,063,584 | 11/1962 | Fleischer et al. | 242/86.5 R |
| 3,690,491 | 9/1972 | Butler, Jr. | 414/684 X |
| 3,902,612 | 9/1975 | Hall | 414/911 X |
| 4,091,946 | 5/1978 | Kraft et al. | 414/911 X |
| 4,338,059 | 7/1982 | Anderson | 414/911 X |
| 4,354,793 | 10/1982 | Perry | 414/911 X |
| 4,385,862 | 5/1983 | McVaugh | 414/911 X |

Primary Examiner—Leslie J. Paperner
Assistant Examiner—Stuart J. Millman
Attorney, Agent, or Firm—Zarley, McKee, Thomte, Voorhees & Sease

[57] ABSTRACT

A cable reel handling and transporting trailer including a wheeled frame having a forwardly extending hitch provided on the forward end thereof. The wheeled frame includes a pair of laterally spaced-apart and longitudinally extending side frames having a wheel rotatably mounted thereon. A hydraulically operated leveling arm is pivotally mounted on each of the side frames and is adapted to engage a spindle reel assembly extended through a cable reel to roll the spindle reel assembly forwardly on the leveling arms. When the spindle reel assembly has reached the forward end of the leveling arms, a pair of hydraulic cylinders are actuated which engage the opposite ends of the spindle reel assembly so that the spindle reel assembly and the cable reel are moved upwardly on a forwardly extending guide rail into a lock/transport/rotating position. A hydraulic motor is operatively connected to one end of the spindle reel assembly for laying and retrieving the cable on the cable reel. A reel brake is provided on the trailer adapted to engage the spindle reel assembly for preventing back-lash.

10 Claims, 11 Drawing Figures 4,701,098

CABLE WHEEL HANDLING AND TRANSPORTING TRAILER

BACKGROUND OF THE INVENTION

Telephone, electrical transmission and fiber optic cables are normally wound upon wooden or metal reels or spools. The reels can be quite large and heavy which makes the handling and transporting of the same very difficult. A further complicating factor is that the cables are wound upon reels having various dimensions. Thus, a reel handling apparatus may accommodate a large reel but will be unable to accommodate a smaller reel and vice versa.

Many types of reel handling and transporting trailers or the like have been previously provided. However, the prior art devices suffer from several shortcomings. One disadvantage of the prior art machines is that they are not convenient to use. A further disadvantage is that the prior art machines cannot accommodate reels of different dimensions.

It is therefore a principal object of the invention to provide an improved cable reel handling and transporting trailer.

A further object of the invention is to provide a cable reel handling and transporting trailer which allows for the engagement, lifting and locking for transportation of a large variety of cable reel widths and diameters.

A further object of the invention is to provide a cable reel handling and transporting trailer including a spindle reel assembly which is inserted into the cable reel to provide a means for lifting and driving the cable reel.

Still another object of the invention is to provide a cable reel handling and transporting trailer including a drive mechanism which engages the cable reel spindle to rotate the cable reel for laying and retrieving cable.

Yet another object of the invention is to provide a cable reel handling and transporting trailer including a pair of hydraulically operated leveling arm assemblies which may be individually raised and lowered to position small reels in the correct position for loading the cable reels onto the trailer.

Still another object of the invention is to provide a cable reel handling and transporting trailer including a manual reel brake assembly which is in engagement with the spindle reel assembly for preventing back-lash.

Still another object of the invention is to provide a cable reel handling and transporting trailer including a forwardly extending hitch having a landing gear drive mechanism mounted thereon for positioning the reel carrier in the proper relationship to enable the loading of a cable reel on the trailer.

Still another object of the invention is to provide a cable reel handling and transporting trailer including means for positioning the cable reel into a lock/travel/rotating positioning.

Still another object of the invention is to provide a cable reel handling and transporting trailer which may be operated by a single person.

Still another object of the invention is to provide a cable reel handling and transporting trailer which is economical of manufacture and durable in use.

These and other objects will be apparent to those skilled in the art.

SUMMARY OF THE INVENTION

A cable reel handling and transporting trailer is provided including a wheeled frame means having laterally spaced-apart and longitudinally extending side frames having a front frame extending between the forward ends of the side frames. A wheel member is rotatably mounted on each of the side frames and a landing gear drive mechanism is positioned on the forwardly extending hitch to enable the trailer to be positioned relative to the cable reel which is to be loaded onto the trailer. A hydraulically operated leveling arm is pivotally mounted on each of the side frames which is adapted to engage one end of a spindle reel assembly extended through the cable reel so that the cable reel may be moved forwardly on the leveling arms. An upwardly and forwardly extending guide rail is positioned forwardly of each of the forward ends of the leveling arms. Hydraulic lift cylinders are mounted on the side frames and are adapted to engage the ends of the spindle reel assembly when the cable reel has been moved to the forward ends of the leveling arms. The hydraulic lift cylinders push the spindle reel assembly and the cable reel mounted thereon upwardly and forwardly on the guide rails into a rotating and travel position. A locking apparatus is provided at the upper ends of each of the guide rails for rotatably locking the spindle reel assembly and cable reel in position. A hydraulic motor is mounted on one of the side frames and is adapted to be operatively connected to one end of the spindle reel assembly to rotate the spindle reel assembly and the cable reel for laying and retrieving cable. A variable resistance brake is provided at the other end of the spindle reel assembly for preventing back-lash. The spindle reel assembly may accommodate cable reels having various dimensions. When a large reel is being loaded onto the trailer, the reel is positioned between the side frames with the opposite ends of the spindle reel assembly engaging the side rails. The hydraulic lift cylinders are then used to push the spindle reel assembly and reel upwardly on the guide rails for engagement with the rotatable locking apparatus.

DESCRIPTION OF THE PREFERRED EMBODIMENT

Figure 1:
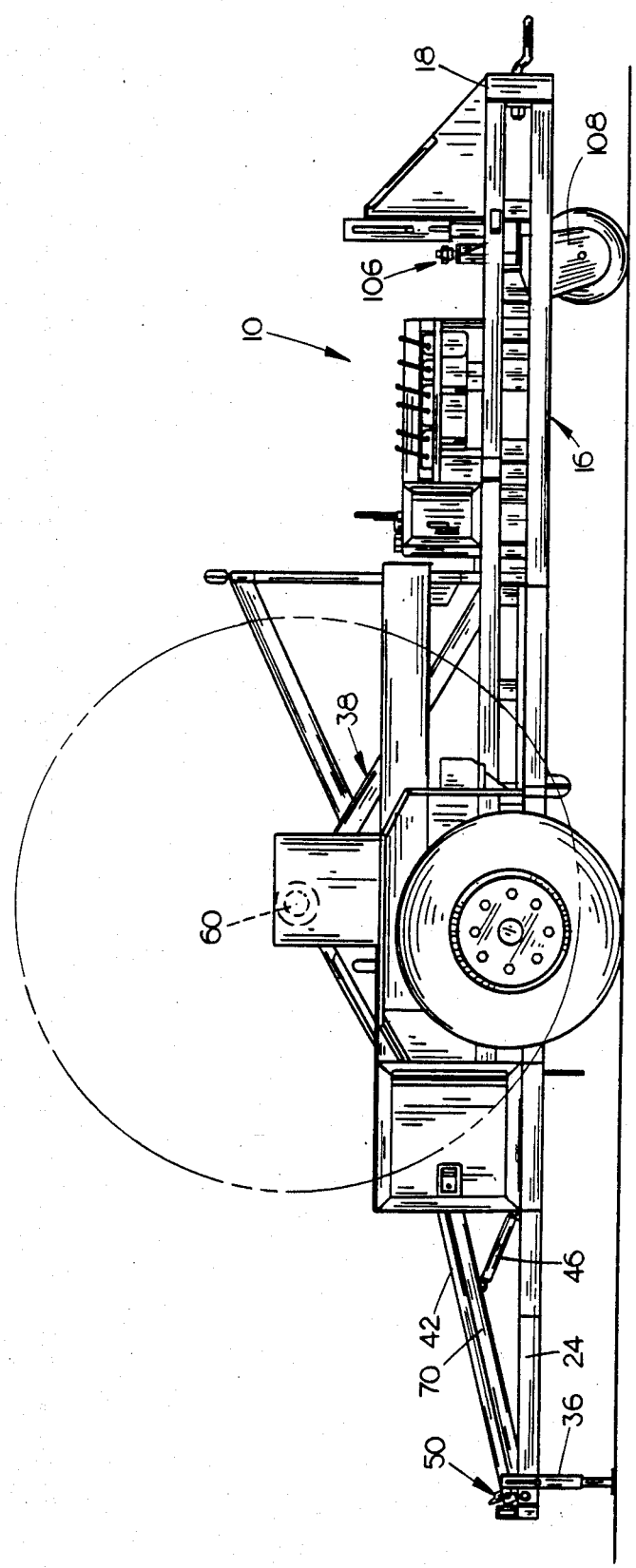
FIG. 1 is a side view of the trailer of this invention with the broken lines representing a large cable reel positioned thereon.
Figure 2:
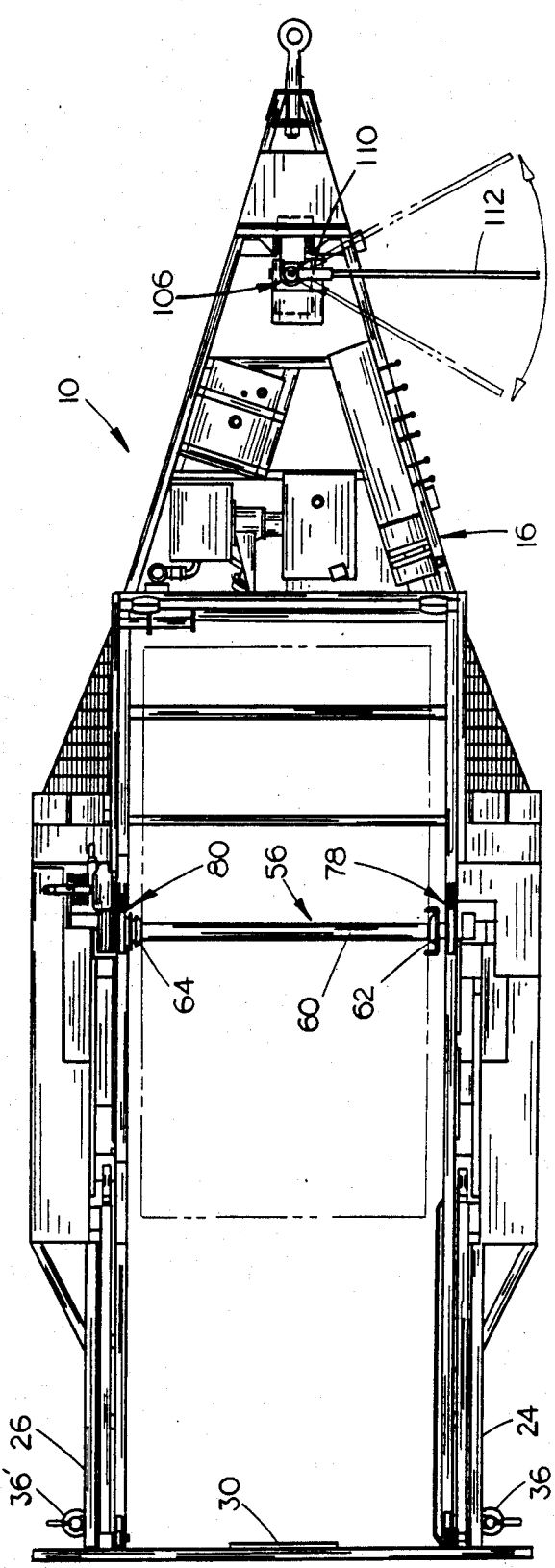
FIG. 2 is a top view of the trailer of FIG. 2.
Figure 3:
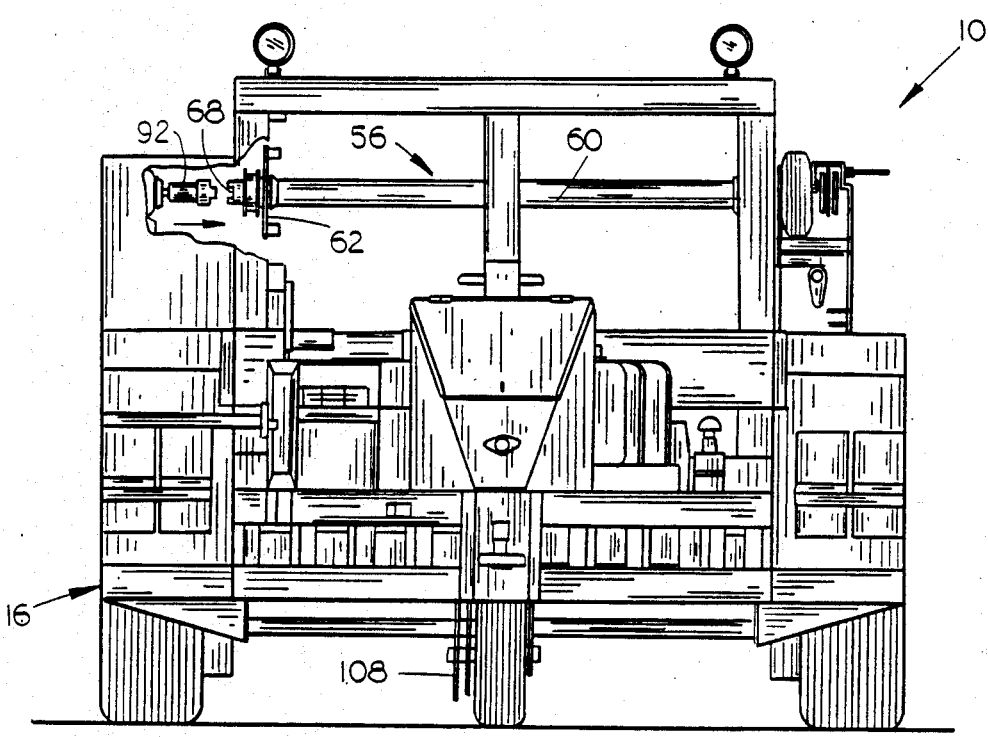
FIG. 3 is a front view of the trailer.
Figure 4:
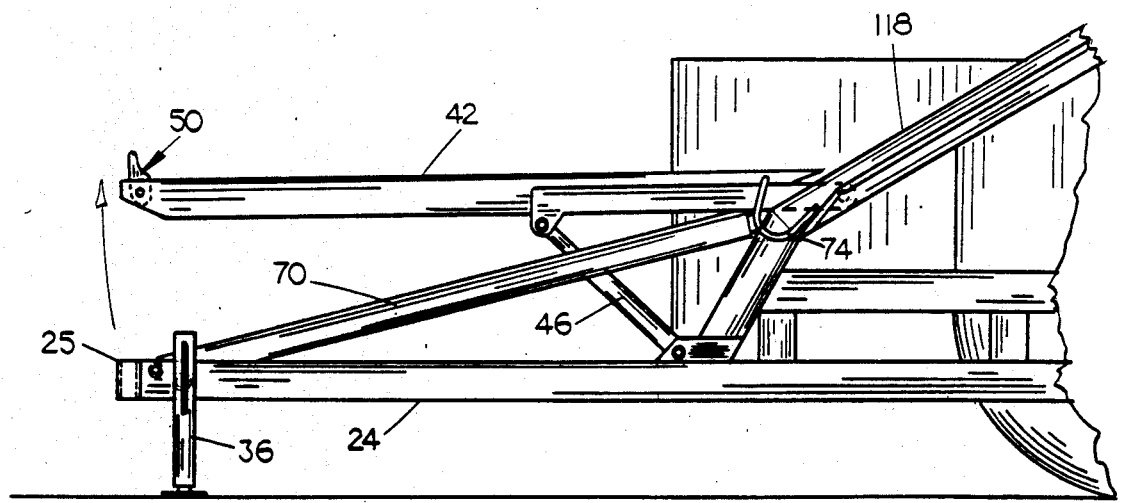
FIG. 4 is a partial side view of the rear of the trailer.
Figure 7:
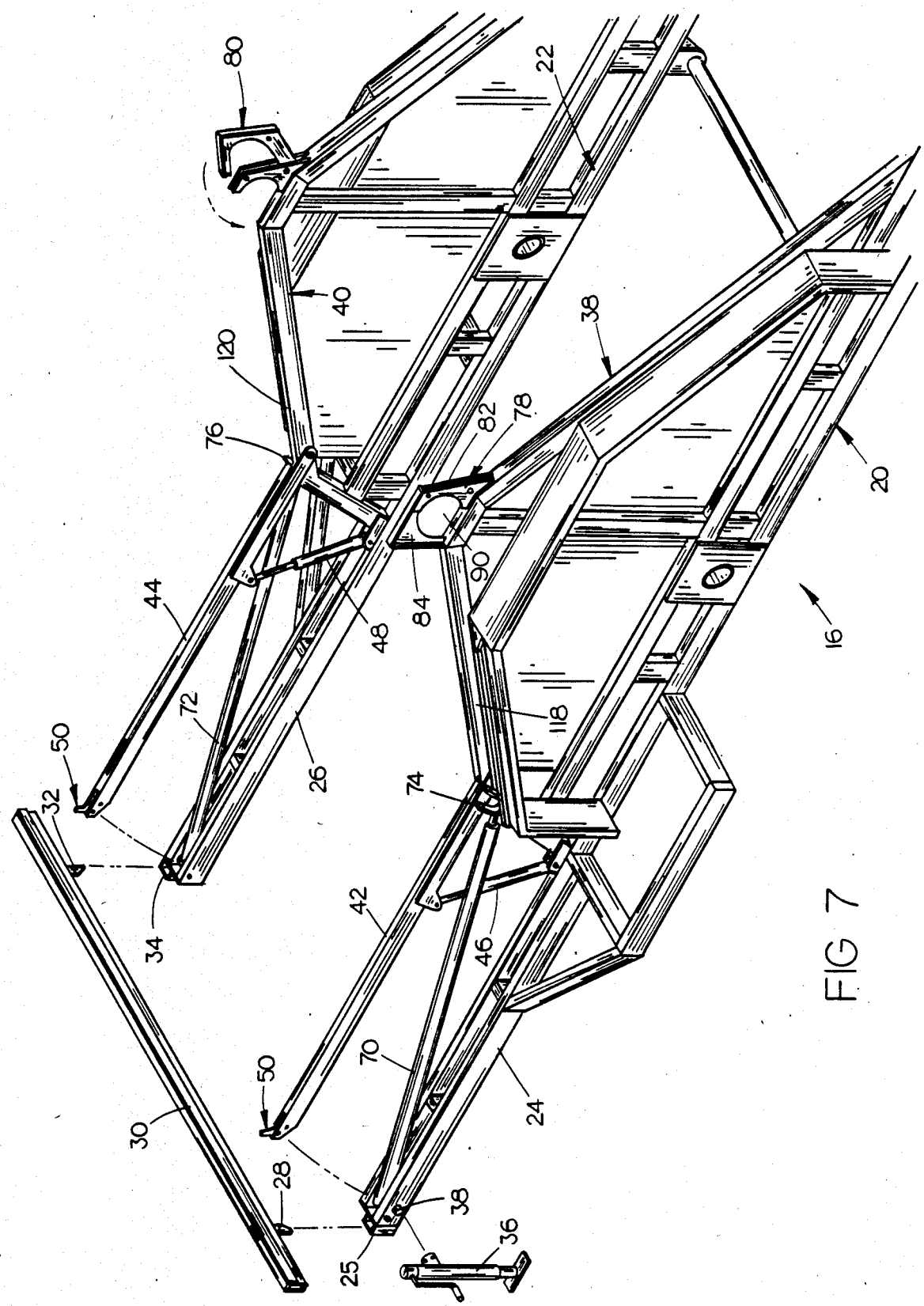
FIG. 7 is a partial perspective view of the trailer.
Figure 8:
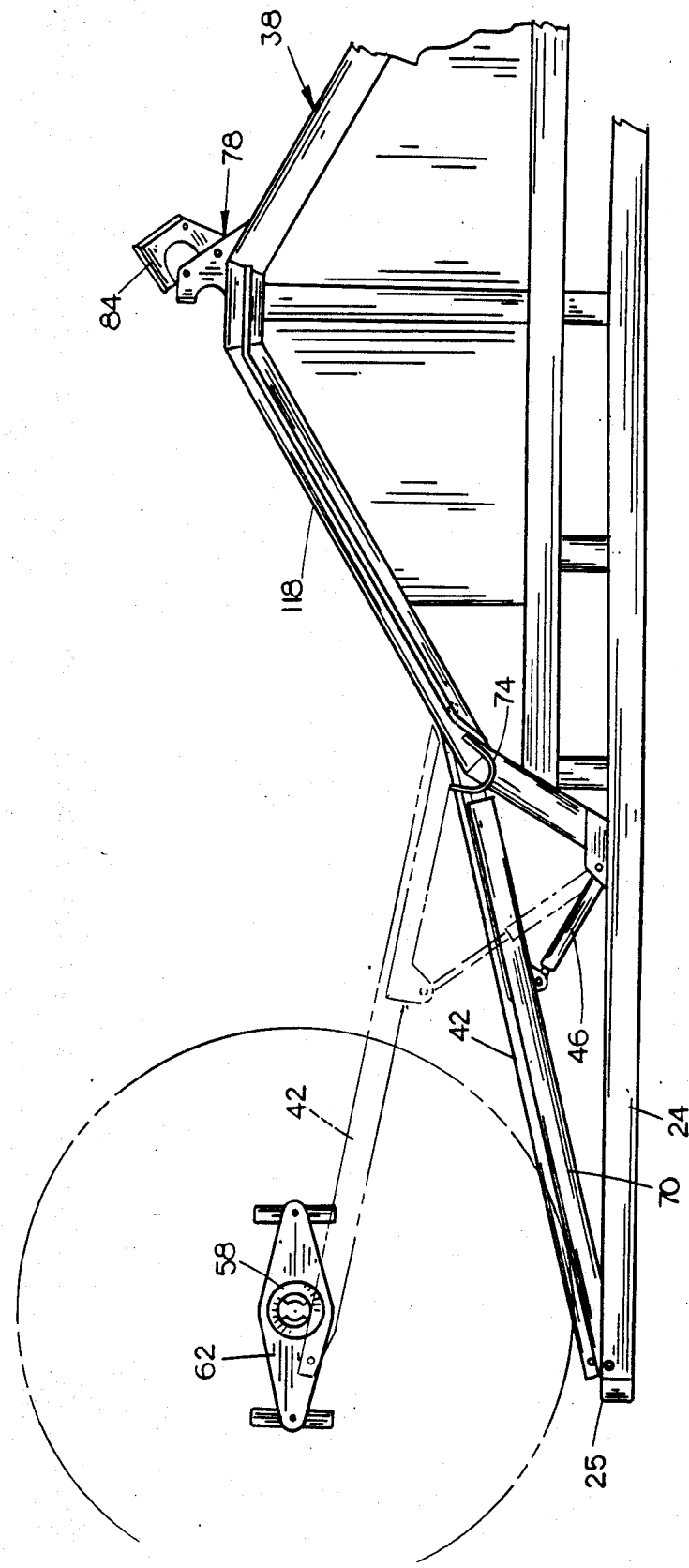
FIG. 8 is a side view illustrating the leveling arm assembly being used to load a reel on the trailer.
Figure 9:
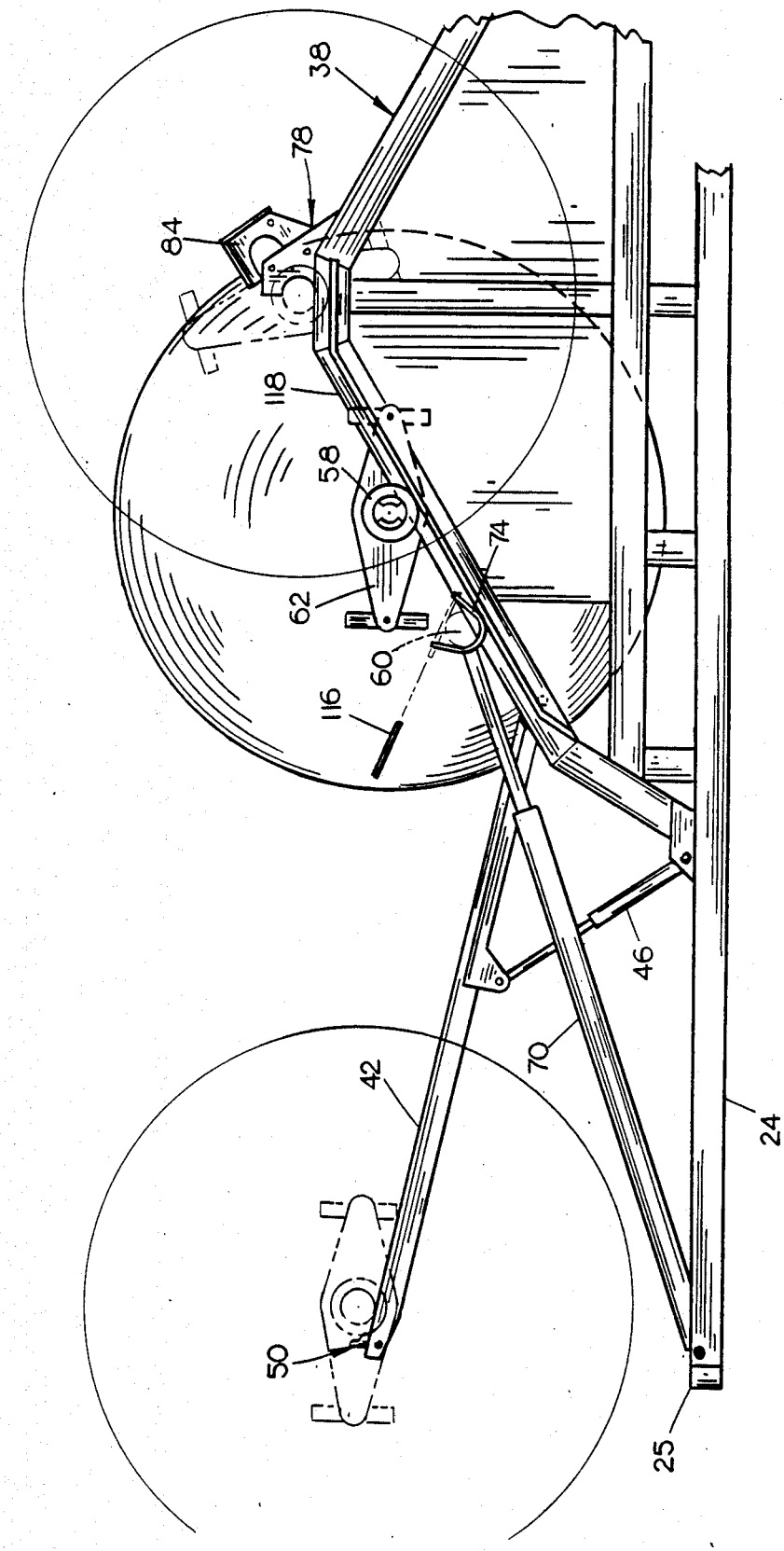
FIG. 9 is a view similar to FIG. 8 except that a larger reel is being loaded than that which is shown in FIG. 8.

The cable reel handling and transporting trailer of this invention is referred to generally by the reference numeral 10 while the numerals 12 and 14 refer to cable reels wherein cable reel 12 has a larger diameter than cable reel 14. Trailer 10 is comprised of a wheeled frame means 16 having a hitch means 18 at its forward end. Frame means 16 includes a pair of side frames 20 and 22 which extend rearwardly from the forward end of the trailer in a spaced-apart manner. Side frame 20 includes a generally horizontally disposed frame member 24 having a pocket 26 at its rearward end which is adapted to receive the stake 28 of rear frame member 30. Rear frame member 30 is also provided with a stake 32 which extends downwardly from its other end and which is adapted to be received by the pocket 34 positioned on the rearward end of frame member 26 of side frame 22. A stabilizer jack 36 is removably mounted on stub 38 positioned at the rearward end of frame member 24 as illustrated in FIG. 7. As seen in FIG. 2, a stabilizer jack 36' is removably mounted on the rearward end of frame member 26.

Figure 10:
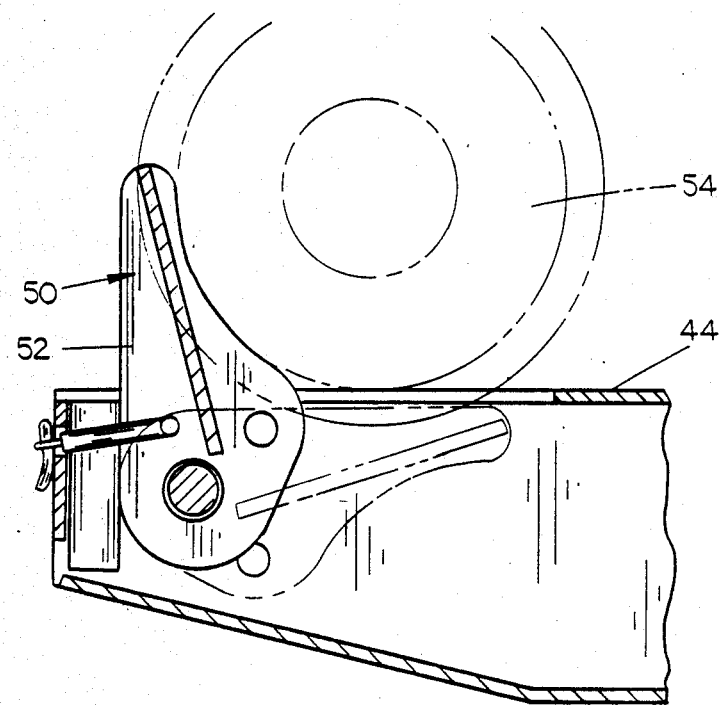
FIG. 10 is a sectional view illustrating the mechanism at the lower end of the lifting arm assembly for preventing the cable reel from rolling therefrom.

Side frames 20 and 22 are provided with substantially inverted V-shaped frame portions 38 and 40. Lift arms 42 and 44 are pivotally secured at their forward ends to frame portions 38 and 40 and are pivotally movable by means of hydraulic lift cylinders 46 and 48 respectively. Cylinders 46 and 48 are normally retracted so that the rearward ends of the lift arms 42 and 44 are in their lowermost position in engagement with the rearward ends of frame members 24 and 26 respectively. Each of the lift arms 46 and 48 are provided with a pivotal latch assembly referred to generally by the reference numeral 50. As seen in FIG. 10, latch assembly 50 includes a latch member 52 which may be selectively pivotally moved from the position illustrated by solid lines in FIG. 10 to the position illustrated by broken lines in FIG. 10. When the latch member 52 is in the position illustrated by solid lines in FIG. 10, latch member 52 prevents the roller 54 of spindle assembly 56 from rolling from the lift arms. Spindle assembly 56 includes a roller 58 which is adapted to roll upon lift arm 44 as illustrated in the drawings. As seen in the drawings, roller 54 is adapted to roll upon the lift arm 42 when smaller reels are being handled.

Figure 6:
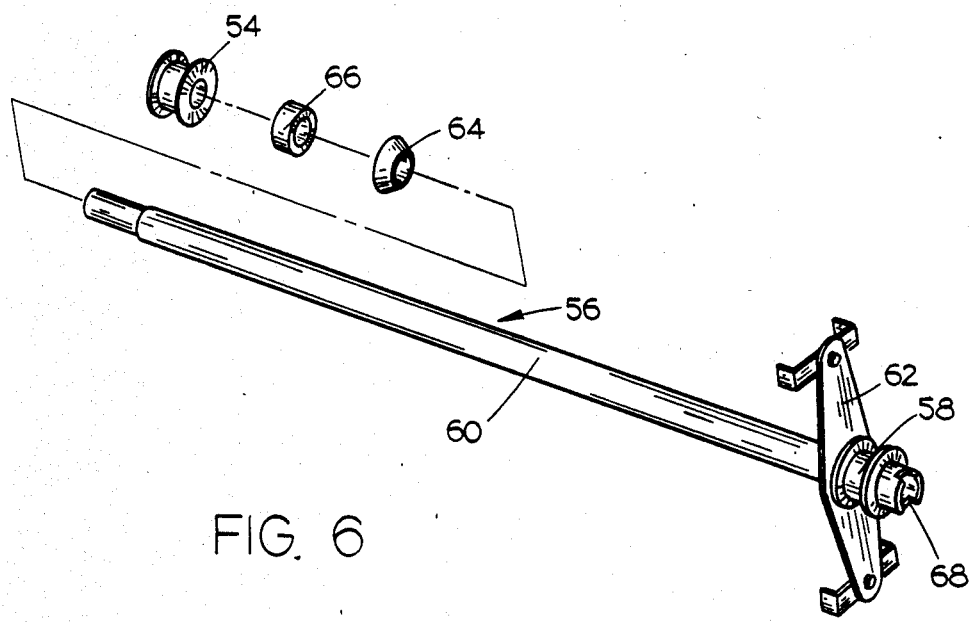
FIG. 6 is an exploded perspective view of the cable reel spindle.

As seen in FIG. 6, spindle assembly 56 includes an axle 60 upon which the rollers 54 and 58 are mounted. Reel arm 62 is mounted on axle 60 for rotation therewith adjacent one end thereof. The numeral 64 refers to a wedge collar which is adapted to be slipped onto axle 60 and engage one end of the reel. Collar 66 is adapted to be positioned on axle 60 outwardly of wedge collar 64 and is adapted to be clamped onto the axle 60 to maintain wedge collar 64 in position. The end of axle 60 is provided with notches as will be described in more detail hereinafter.

Figure 11:
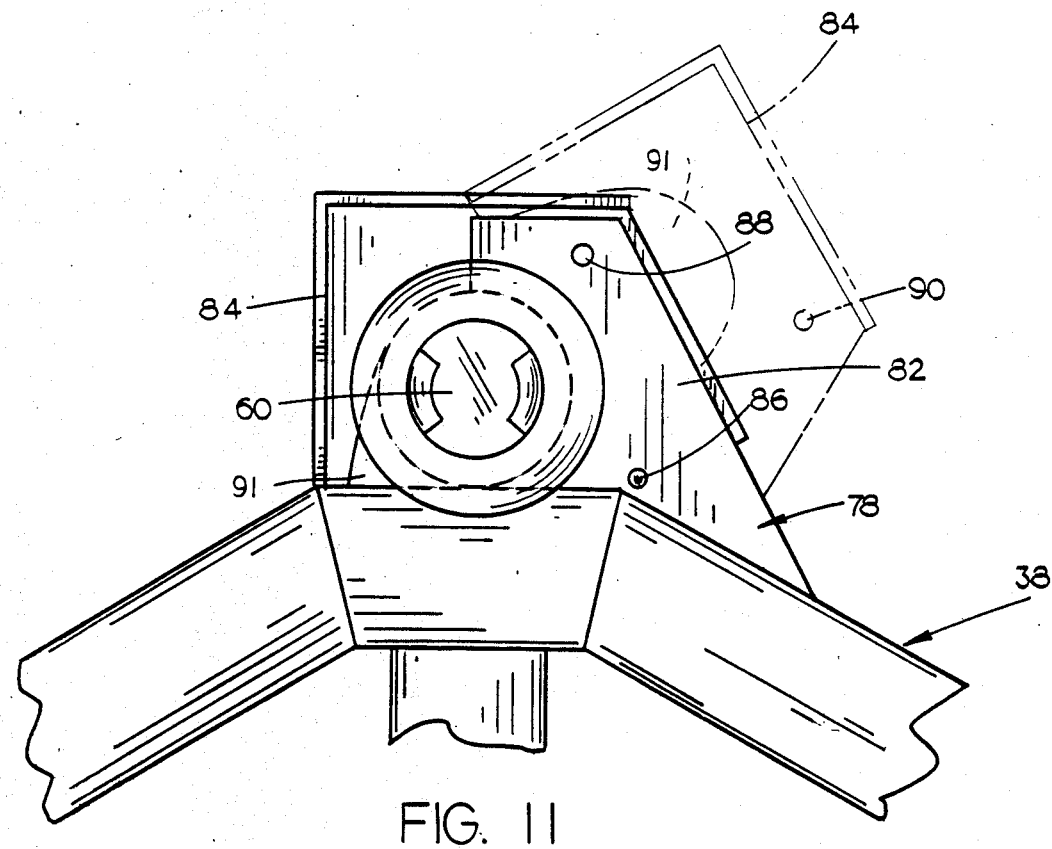
FIG. 11 is a side elevational view of the means for rotatably supporting and locking the cable reel into position on the trailer.

Lift cylinders 70 and 72 are pivotally secured at their rearward ends to frame members 24 and 26 and extend forwardly therefrom as best seen in FIG. 7. Spindle yokes 74 and 76 are mounted on the rod ends of cylinders 70 and 72 respectively and are adapted to engage the ends of axle 60 to move spindle reel assembly 56 and the reel mounted thereon upwardly and forwardly into the bearing carriers 78 and 80. Bearing carrier 78 includes a bearing portion 82 which is fixed in position and a movable bearing portion 84 which is pivotaly secured to bearing portion 82. As seen in FIG. 11, bearing portion 84 is pivotally secured to bearing portion 82 by means of pin 86. Bearing portion 82 is provided with an opening 88 formed in the upper end thereof which is adapted to register with the opening 90 in bearing portion 84 so that a pin may be extended therethrough to lock bearing portion 84 in its locked or closed position. As seen in the drawings, bearing portions 82 and 84 define an opening 91 which is adapted to receive the roller or bearing 54. Bearing carrier 80 is adapted to receive the roller or bearing 58 therein.

Figure 5:
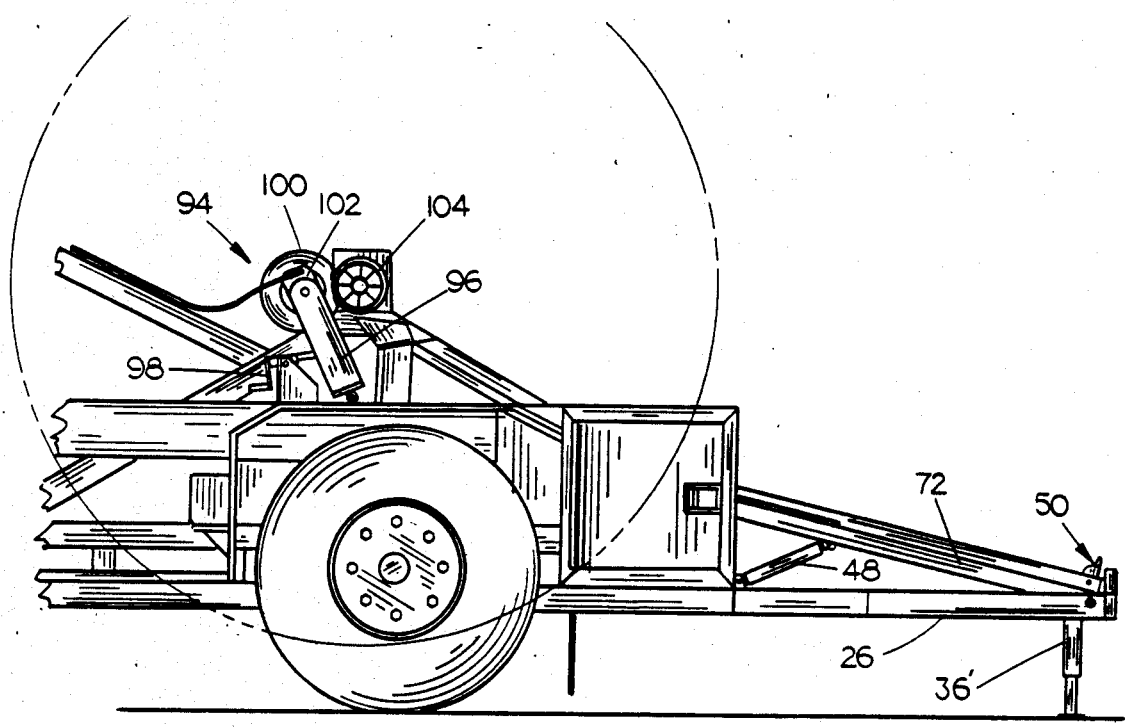
FIG. 5 is a partial side view of the forward end of the trailer.

The hydraulic motor (not shown) is mounted at the upper end of frame portion 38 and has a power shaft which is adapted to be moved into driving engagement with the notched end 68 of axle 60. Mounted on frame portion 40 is a reel brake assembly 94. Assembly 94 includes a pivotal support 96 which is pivotally connected at its lower end to frame portion 40. A screw crank 98 is provided for pivotally moving support 96 forwardly and rearwardly as desired. A rubber wheel 100 is rotatably mounted on the upper end of support 96 and has a hydraulic disk brake 102 connected thereto for yieldably preventing the rotation of wheel 100 as desired. As seen in FIG. 5, wheel 100 is adapted to be moved into engagement with the pulley 104 which is mounted on the end of axle 60 for rotation therewith outwardly of roller 58.

The numeral 106 refers to a landing gear assembly which is mounted at the forward end of the trailer for steering and propelling the trailer to the desired location with respect to the reel being accommodated. Landing gear assembly 106 includes a wheel support 108 which is pivotally mounted on the trailer about a vertical axis. Collar 110 is operatively connected to the wheel support 108 and is adapted to receive a handle 112 therein to enable a person to manually pivot wheel support 108 relative to the trailer. Wheel 112 is rotatably mounted on wheel support 108 and is powered in either a forwardly or rearwardly direction by means of a hydraulic motor connected thereto. Wheel support 108 and wheel 112 may be raised and lowered relative to the trailer in conventional fashion by means of a conventional screw jack assembly.

Rear frame member 30 is simply provided as a stabilizer extending between the frame members 24 and 26 during periods that the trailer is being moved over the road. When it is desired to load a large reel 114, rear frame member 30 is removed and the trailer would normally be disconnected from its prime mover. The power source for the various hydraulic components would then be activated to provide power to the landing gear assembly 106 so that the trailer 10 may be backed rearwardly relative to the large reel 114 so that the reel 114 will be positioned between the frame members 24 and 26.

Axle 60 is extended through the center of the reel 114 and the collars 64 and 66 secured in position so that reel arm 62 will engage the side of the reel. Rollers 54 and 58 are then positioned on the ends of the axle 60.

Trailer 10 is then backed relative to the reel until the rollers 54 and 58 engage the inclined guide rails 116 and 118 respectively. If bearing carriers 78 and 80 have not been previously opened, they would be opened at this time. Desirable or necessary, stabilizer jacks 30 are positioned on the rearward ends of the frame members 24 and 26 respectively and are lowered into ground engagement. Lift cylinders 70 and 72 are then hydraulically extended so that the yokes 74 and 76 engage the ends of the axle 60. Retaining pin 116 is then extended through yoke 74 to maintain the connection between yoke 74 and the end of axle 60. Similarly, a retaining pin would be extended through yoke 76 to maintain the connection between yoke 76 and the other end of axle 60. Lift cylinders 70 and 72 are further extended which causes the rollers 54 and 58 to roll upwardly on guide rails 118 and 120 respectively. Continued extension of lift cylinders 70 and 72 causes the rollers 54 and 58 to roll upwardly on the side rails 118 and 120 until the rollers 54 and 58 are received within the open bearing carriers 78 and 80 respectively. The movable or pivotal bearing portions are then closed so that the rollers 54 and 58 are held within the bearing carriers 78 and 80 respectively. A suitable pin is then extended through the openings 88 and 90 in bearing portions 82 and 84 to lock the bearing carrier 78 in its closed position. Similarly, bearing carrier 80 would be also locked.

If desired, lift cylinders 70 and 72 may then be retracted so that they will move downwardly to the position illustrated in FIG. 7. If the reel 114 is to be transported, the stabilizer jacks 36 and 36' would be raised and the rear frame member 30 installed. If cable is to be manually or physically pulled from reel 114, the power shaft 92 of the hydraulic motor would be disconnected from engagement with the end of the axle 60. In certain instances, however, the hydraulic motor will be utilized to power unwind the cable from the reel. However, whether the hydraulic motor is being used to power unwind or the cable is being physically pulled from the reel, the reel brake assembly 64 would be brought into engagement with the pulley 104 so that the reel 114 will not continue to rotate after pulling tension has been removed from the reel.

If it is desired to either power unwind or power wind the reel, the power shaft 92 is moved into engagement with the notched end 68 of axle 60 so that the axle 60 can be rotated in the desired direction. Rotation of shaft 60 causes the reel arm 62 to rotate which in turn causes the reel to rotate.

The leveling arms 42 and 44 are designed primarily for smaller reels. When smaller reels are being handled, the rollers 54 and 58 would not be sufficiently high enough to engage the guide rails 118 and 120. When a small reel is being handled, the spindle assembly 56 is installed in the small reel 122 in conventional fashion. The trailer is then backed relative to the reel 122 until the rearward ends of the leveling arms 42 and 44 are positioned rearwardly of the roller 54 and 58. The safety latches 52 would then be moved to their raised or safety position to prevent the rollers 54 and 58 from rolling from the leveling arms 42 and 44 respectively. Extension of cylinders 46 and 48 causes the leveling arms 42 and 44 to be pivotally moved upwardly until the leveling arms 42 and 44 engage the rollers 54 and 58 respectively. Continued upward movement of the leveling arms 42 and 44 will cause the small reel 122 to be raised from the ground so that the rollers 54 and 58 will roll forwardly along the upper surface of the leveling arms 42 and 44 until the rollers 54 and 58 engage the side rails 118 and 120. The lift cylinders 70 and 72 are then extended so that the yokes 74 and 76 will engage the ends of the axle 60 so that the reel 122 may be pushed upwardly and forwardly on the side rails 118 and 120 into the bearing carriers 78 and 80 respectively.

Thus it can be seen that a novel cable reel handling and transporting trailer has been provided which permits either large or small reels to be handled and transported. It can also be seen that the trailer of this invention not only provides a means for transporting a cable reel from one location to another but also permits power winding or unwinding of the cable reel once the cable reel has been transported to the desired location. It can therefore be seen that the invention accomplishes at least all of its stated objectives.

We claim:

1. A cable reel handling and transporting trailer, comprising,
    a wheeled frame means including first and second laterally spaced-apart longitudinally extending side frames having rearward and forward ends, and a front frame extending between the forward ends of said side frames,
    a wheel member rotatably mounted on each of said side frames,
    a hitch means positioned forwardly of said front frame adapted to be connected to a prime mover,
    first and second elongated leveling arms having rearward and forward ends,
    said first and second leveling arms being pivotally secured at their forward ends to said first and second side frames respectively intermediate the lengths thereof,
    first and second hydraulic cylinders connected to said first and second leveling arms for pivotally raising and lowering the rearward ends thereof with respect to said side frames respectively,
    said first and second side frames having first and second elongated guide rails mounted thereon respectively which extend upwardly and forwardly from the forward ends of said first and second leveling arms respectively,
    a cable reel spindle adapted to be extended through the hub of a cable reel, said spindle having opposite ends,
    said spindle having spaced-apart first and second rollers mounted thereon,
    said first roller adapted to roll upon said first leveling arm and said first guide rail,
    said second roller adapted to roll upon said second leveling arm and said second guide rail,
    a third hydraulic cylinder, having a base end and a rod end, pivotally connected at its base end, to said first side frame adjacent the rearward end thereof and extending forwardly therefrom, the rod end of said third hydraulic cylinder being positioned adjacent the forward end of said first leveling arm when said third hydraulic cylinder is in its substantially retracted position,
    a fourth hydraulic cylinder, having a base end and a rod end, pivotally connected at its base end, to said second side frame adjacent the rearward end thereof and extending forwardly therefrom, the rod end of said fourth hydraulic cylinder being positioned adjacent the forward end of said second leveling arm when said fourth hydraulic cylinder is in its substantially retracted position,
    the extension of said first and second hydraulic cylinders causing the rearward ends of said leveling arms to be raised to a position above the forward ends thereof so that said first and second rollers will roll forwardly on said leveling arms when said spindle is positioned thereon,
    spindle engaging means on the rod ends of said third and fourth hydraulic cylinders for selective engagement with the ends of said spindle whereby extension of said third and fourth hydraulic cylinders will move said spindle upwardly and forwardly on said first and second guide rails respectively, first means at the upper end of said first guide rail for rotatably receiving said first roller, second means at the upper end of said second guide rail for rotatably receiving said second roller, power means on one of said side frames for rotating said spindle, and control means for operating said hydraulic cylinders.

2. The trailer of claim 1 wherein said first and second hydraulic cylinders may be selectively individually controlled by said control means.

3. The trailer of claim 1 wherein each of said leveling arms has a retractable pick-up finger pivotally mounted on the rearward end thereof for preventing said spindle from rolling rearwardly therefrom.

4. The trailer of claim 1 wherein a selectively vertically movable landing gear is mounted on said hitch means, said landing gear including a selectively pivotal wheel, and power means for rotating said wheel.

5. The trailer of claim 1 wherein a reel brake means is mounted on the other of said side frames for operative engagement with said spindle for resisting the rotational movement of said spindle at times.

6. The trailer of claim 5 wherein the resistance offered by said brake means is adjustable.

7. The trailer of claim 1 wherein said means on each of said rod ends of said third and fourth hydraulic cylinders comprises a U-shaped yoke adapted to receive one end of said spindle.

8. The trailer of claim 1 wherein a transversely extending brace is removably secured to and extends between the rearward ends of said side frames.

9. The trailer of claim 1 wherein a ground engaging jack means is removably mounted on the rearward end of each of said side frames.

10. The trailer of claim 1 wherein said first and second means at the upper ends of said first and second guide rails includes means for rotatably locking said spindle therein.

* * * * *